No. 626,780. Patented June 13, 1899.
W. D. BAKER.
APPARATUS FOR MAKING DRY PICKLE.
(Application filed Dec. 30, 1897.)
(No Model.)
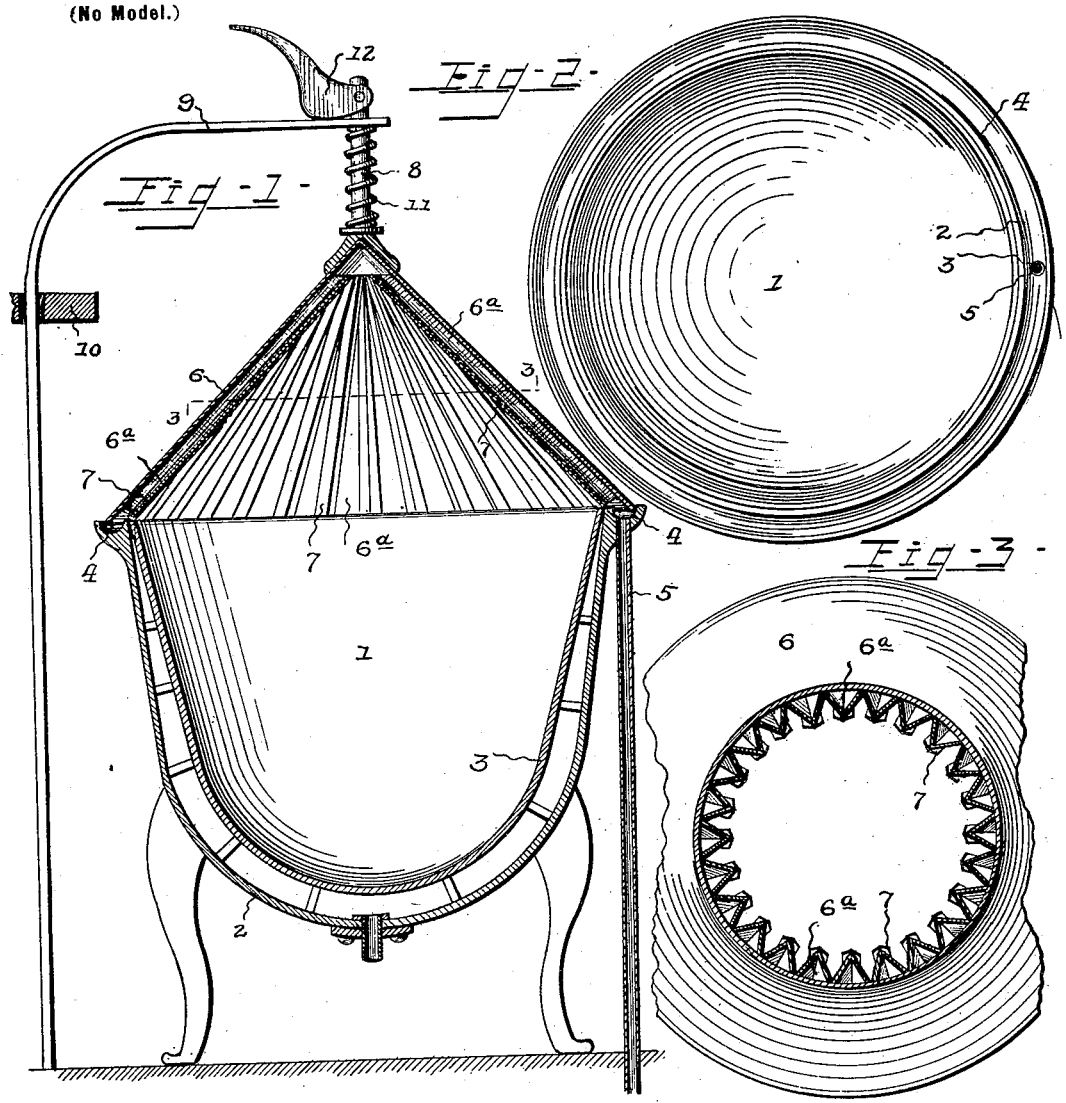
Inventor:-
Willard D. Baker
By his Attorneys,
C A Snow & Co.
Witnesses

UNITED STATES PATENT OFFICE.

WILLARD D. BAKER, OF ROGERS, ARKANSAS, ASSIGNOR OF FIVE-EIGHTHS TO E. N. STEARNES AND S. B. WING, OF SAME PLACE.

APPARATUS FOR MAKING DRY PICKLE.

SPECIFICATION forming part of Letters Patent No. 626,780, dated June 13, 1899.

Application filed December 30, 1897. Serial No. 664,509. (No model.)

*To all whom it may concern:*

Be it known that I, WILLARD D. BAKER, a citizen of the United States, residing at Rogers, in the county of Benton and State of Arkansas, have invented a new and useful Apparatus for Making Dry Pickle, of which the following is a specification.

My invention relates to an evaporating apparatus for preparing dry pickle, adapted to be packed and transported in a dry state, and capable of subsequent moistening, if preferred in that condition.

The process in the course of which my evaporating apparatus is used contemplates arranging layers of salted vegetables in a suitable vessel and submitting the same to pressure for an interval, after which accumulated moisture is drained therefrom, subsequently boiling the salted vegetables in vinegar seasoned with suitable spices and condiments, then exposing the prepared vegetables to an evaporating heat, preferably a moist heat, and condensing and conveying the moisture away from the contents of the receptacle, air and light being excluded, and finally desiccating the pickle by steam heat and a hot-air blast until sufficiently dry to pack.

In connection with the third step of the above-indicated process I use an apparatus for evaporating and conveying the moisture of the pickle away from the contents of the receptacle, and in order that the process may be fully understood, particularly as to said third step, reference is had to the accompanying drawings, wherein—

Figure 1 is a vertical sectional view of an evaporating-receptacle provided with a cone top or cover constructed in accordance with my invention. Fig. 2 is a plan view of the receptacle with the top or cover omitted. Fig. 3 is a detail transverse section of the top or cover on the line 3 3 of Fig. 1.

Similar numerals of reference indicate corresponding parts in all the figures of the drawings.

The receptacle 1 is of the general construction known as a "jacket-kettle;" the same having an outer shell 2, of metal or its equivalent, and an inner shell or lining 3, of porcelain, stoneware, or equivalent material, as indicated in Fig. 1. At the upper edge or rim of the kettle is arranged a drip channel or groove 4, preferably arranged outside of the periphery of the kettle, and communicating with an outlet-pipe 5, by which the contents of the channel may be conveyed to a suitable point of deposit or discharge. The cap or cover 6 is of cone shape, with its lower edge seated in the drip-channel and having a corrugated inner surface, as shown at 6ª, to provide an extended condensing area. The corrugations are preferably of cross-sectional V shape, and suspended by the upwardly-convergent angles or apexes of the corrugations are drip-troughs 7, adapted to convey condensed moisture to the drip-channel 4. Extending upwardly from the apex of the cone top or cover is a stem 8, extending through a guide-opening in a supporting or crane arm 9, which is swiveled in a suitable support 10, a depressing-spring 11 being coiled upon said stem between the apex of the top or cover and the under surface of said arm to normally hold the top or cover depressed, with its lower edge in the channel or groove 4 of the vessel. Also pivotally connected to the extremity of the stem above the plane of the crane-arm is a cam-shifting lever 12, having a suitable bearing upon the crane-arm, and adapted when depressed at its free end to elevate the top or cover sufficiently to remove its periphery from the drip-channel and thereby enable the crane to be swung laterally to carry the top or cover from the vessel, and thus expose the contents thereof. It will be understood that in practice the moisture arising from the contents of the vessel will be condensed upon the inner surface of the top or cover and will thence follow the troughs 7 to the drip-channel 4 and finally escape through the waste-tube 5.

The complete process is as follows: Prepare the vegetables which are to be pickled and arrange the same with salt in an earthen or wood vessel. Expose the vegetables to pressure, as by placing a weight upon a disk resting thereon and allow to stand from six to twelve hours, after which the contents of the vessel should be thoroughly drained. The salted vegetables should then be placed in a porcelain or stone lined vessel and covered with boiled vinegar impregnated with seasoning condiments and spices. The mixture should then be transferred to a condensing-kettle constructed substantially as shown in the drawings and specifically described hereinbefore. (If the evaporation is to be postponed for any length of time after removal from the seasoned vinegar, the mixture should be placed in a tight vessel and covered with grated horse-radish to prevent formation of mold.) After placing the pickle or prepared vegetables in a condensing-kettle steam should be applied gradually and increased after the vessel has become heated until the contents have reached the boiling-point, or 212° Fahrenheit, and after maintaining this heat for about three minutes it should be reduced to 160° and maintained at that point until the pickle will not "drip" when lifted out of the mass of the contents of the vessel. Obviously care must be taken to occasionally stir the contents of the vessel with a thin spatula to prevent sticking, the cone top or cover being removed for this purpose and immediately returned to exclude light and cold air, (the disadvantage of which is that it discolors the pickle.) If during the process of evaporating and condensing the liquid with which the pickle is saturated the steam should accumulate in the vessel too rapidly to condense and pass through the pipe 4, the cone top should be slightly elevated to remove its lower edge from the channel 4 by depressing the free end of the lever 12. The pickle cannot be thoroughly dried in an evaporator constructed as shown and described; but after the moisture has been removed therefrom until, as above indicated, there is no drip the pickle should be placed upon a desiccating-tray consisting of a perforated wooden or stone plate and should be exposed to a moist or steam heat in an evaporator which is supplied with a hot-air blast. The resulting pickle may be consumed in a dry form as a vegetable or may be moistened with vinegar or water, as preferred.

Having described my invention, what I claim is—

1. In an apparatus for evaporating pickled vegetables, a vessel, having a top or cover provided on its inner surface with depending ribs and attached drip-troughs for conveying condensed liquid to a suitable outlet, substantially as specified.

2. In an apparatus for evaporating the liquid from pickled vegetables, the combination of a vessel provided at its rim with a drip-channel having an outlet, and a cone top or cover removably seated at its lower edge in said drip-channel, and provided upon its interior surface with radiating ribs for conveying condensed moisture to the drip-channel, substantially as specified.

3. In an apparatus for evaporating the liquid from pickled vegetables, the combination with a vessel having an exterior drip-channel provided with an outlet, of a cone top or cover seated at its lower edge in said channel and provided at its inner surface with cross-sectionally-V-shaped corrugations, and upwardly-convergent drip-troughs supported by the apexes of the corrugations for conveying condensed moisture to the drip-channel, substantially as specified.

4. In an apparatus for evaporating the liquid from pickled vegetables, the combination with a vessel provided with an exterior drip-channel, of a cone top or cover seated at its lower edge in the drip-channel and provided with interior conductors for conveying condensed moisture to the drip-channel, a swiveled crane in which an axial stem of the top or cover is fitted for vertical movement, yielding means for normally holding the top or cover depressed, and an elevating-lever connected with the stem and bearing upon the crane for elevating the top or cover in opposition to said yielding means, substantially as specified.

In testimony that I claim the foregoing as my own I have hereto affixed my signature in the presence of two witnesses.

WILLARD D. BAKER.

Witnesses:
FRANK McGAUGHEY,
JOHN REBHOLZ.